United States Patent Office 3,506,276
Patented Apr. 14, 1970

3,506,276
ROTARY SEAL, ESPECIALLY FOR OIL PUMPS
Jorgen Hartvig Petersen, Nordborg, and Leif Viggo Sturlason, Sonderborg, Denmark, assignors to Danfoss A/S, Nordborg, Denmark, a company of Denmark
Filed Feb. 5, 1968, Ser. No. 702,924
Claims priority, application Germany, Feb. 6, 1967,
D 52,207
Int. Cl. F16j 15/34, 15/54
U.S. Cl. 277—91
11 Claims

ABSTRACT OF THE DISCLOSURE

A rotary seal for use on an oil pump having a first seal in a chamber sealing the shaft of the pump against discharge leakage and a second seal defining in conjunction with the first seal an annular space into which leakage from the chamber enters at a reduced pressure and the shaft is sealed from leakage from the annular space exteriorly of the pump. The seals are effected by two co-axial self-aligned seal rings having coplanar radially spaced seal faces or surfaces bearing on a planar surface on a bearing plate. The seal bearing surfaces are all normal to the axis of the shaft and circumferential thereof. Relative rotary motion is imparted to the sealing surfaces. Leakage is returned to the suction side of the pump from the chamber or the annular space.

---

This invention relates to rotary shaft seals, for oil pumps and more particularly to the type of rotary seals in which a face-seal ring is resiliently urged against a seal face on a bearing plate, and the face-seal ring and bearing plate rotate relative to one another.

When rotary seals are used in rotary apparatus such as pumps, there arises a diffculty in achieving a perfect shaft seal. In such seals, if the pressure on the face-seal ring is increased to effect a tighter seal, increased wear occurs which then again leads to loss of fluid-tightness in the seal. Furthermore, a certain amount of lubricating fluid must be allowed to leak over the seal faces. Additionally, in many constructions, the seal-face ring is acted upon by a spring as well as by the pressure of the fluid being pumped. This pressure can fluctuate, in the case of an oil pump, for example, between 2 to 5 lb./cm.$^2$ during operation and up to 10 lb./cm.$^2$ when starting up the pump. Consequently, the gap between the face-seal ring and a stationary seal face or surface varies, so that a variable degree of fluid-tightness results.

Because of this, a certain amount of seepage or leakage has been hitherto tolerated in rotary seals. In the case of pumps for light heating oil, the amount of oil leakage has been in the order of one to two drops per day, for instance. Since this leakage oil then evaporates, leakage could be accepted. In the case of pumps for heavy oils, which contain pitch as well as other tarry substances, residual constituents remain deposited, since these heavy oils do not completely evaporate. For these and other applications, therefore, it is required to prevent seepage or leakage of liquid even of small quantities of this order.

A principal object of this invention is to provide a rotary seal which has a considerably greater fluid-tightness than the known rotary seals.

The rotary shaft seal according to the invention comprises provision of a first face-seal ring circumferentially of the pump shaft in a seal chamber in which the seal assembly is disposed, and in which fluid from the pump being sealed is received from the pump. The first face-seal ring is biased against a pressure seal or bearing plate of the pump housing to effect a first seal circumferentially of the shaft sealing off the chamber from the shaft. A second face-seal is disposed internally of the first face-seal ring spaced therefrom to form an annular space therewith and is biased into engagement with the bearing plate forming therewith a second shaft seal circumferentially of the shaft radially inwardly from the first seal and downstream from the first seal in the leakage path of the fluid from the pump.

The second face-seal ring has only to seal off a small quantity of liquid at a reduced pressure that seeps past the first seal effected by the first face-seal ring. Thus, it is not subjected to any heavy loading or pressure and can be of appropriately simple design. Despite the use of two seal faces, on the two rings, employed in the seal of the invention only one bearing plate, against which the ring sealing surfaces or faces bear, is necessary. The second face-seal ring is largely only acted upon by an associated spring that causes it to bear against the bearing plate. It is largely unaffected by pressure variations of the liquid against which the seals are effected. It can therefore be accurately designed with optimum sealing in view. The second seal effected by the second face-seal ring functions as an emergency seal if the first seal effected by the first face-seal ring should fail.

A particularly simple construction is achieved by the invention, in that the second face-seal ring is mounted in an axial recess in the end face of the first face-seal ring. In case the face-seal rings are rotationally driven, the axial recess can be provided adjacent the inner circumference, and in the face-seal rings are stationary at the outer circumference of the first face-seal ring. The rotary seal readily seals against liquid pressure in the seal chamber in such a manner that the second face-seal ring is substantially uninfluenced by this liquid pressure. A double-seal system of this kind needs to occupy no more space than the known single-seal system or seals. It is particularly advantageous if the two seal face surfaces on the bearing plate, against which the seal rings bear, are formed by a single planar annular surface.

In one embodiment of the invention, the second face-seal ring bears, in a resilient manner, against the first ring. This offers the advantage that the spring biasing force on the second face-seal ring remains almost constant. The possible displacements of the first face-seal ring, axially of the shaft, are so trifling that, although the change in the gap occasioned thereby is considerable, they can be ignored as regards their influence upon the spring-force that applies load to the second face-seal ring.

In a preferred embodiment, the bearing plate is held in a plane perpendicular to the shaft by means of abutment faces on the housing and the shaft respectively. Also, the first and/or second face-seal ring is supported in a self-aligning manner on the shaft and in the housing by means of a seal ring or annular square packing. This self-aligning arrangement ensures that the end-faces of the two face-seal rings bear a full 360°, against the seal face of the bearing plate perpendicular to the axis of the shaft. The system is also improved by the fact that the surfaces of the face-seal rings bearing against the bearing plate can be made narrower in view of the division of the seals into two rings. Since the face-seal rings are centered independently of each other, uneven wear can be offset independently of each other. Furthermore, double protection is provided against seepage or leakage of liquid along the shaft and/or the housing. In this connection, it is advantageous if the spring-forces acting on the first and/or second face-seal ring are centrally directed.

Since the loading of/or pressure applied on the second face-seal ring differs from that of the first, a different bearing material may also be used therefor. In particular, the second face-seal ring can be made from a material having less friction with regard to the seal face than that of the first face-seal ring, so that it has good running properties without need of lubrication. For example, in conjunction with a bearing plate of mild steel, cast iron, or some other carrier material, to which is applied a coating of wear-resisting material such as molybdenum, metal carbide or a ceramic substance, use can be made of a first face-seal ring of wear-resisting material, e.g. sintered synthetic carbon, and a second face-seal ring of plastic material, e.g. polytetrafluoroethylene, with molybdenum contained in the pores thereof.

The first face-seal ring is connected to the shaft or the housing, and the second face-seal ring to the first face-seal ring in such a manner that the connected elements do not rotate relative to each other. In particular, the second face-seal ring can be connected to the first through its biasing springs so that the two rings rotate together. Instead of this, the second face-seal ring may however, be driven direct by the shaft or it can have teeth that mesh with teeth on the first face-seal ring. The first face-seal ring is advantageously connected to the shaft or the housing, in such manner that there is no relative rotation, by means of the biasing spring of the rotary seal that biases the ring toward the bearing plate.

In a preferred embodiment, the bearing plate rotates with the shaft and is sealed with respect thereto by means of a sealing ring, while the two face-seal rings are held against rotation and each is separately sealed with respect to the interior circumferential wall of the housing, by means of a sealing ring. In this arrangement, only one seal face is required, whereas in the case of a stationary bearing plate and rotating face-seal rings, a seal face is required between a rotating seat for the spring of the rotary seal and the housing.

Additional protection against loss of fluid-tightness is provided if the annular space between the two face-seal rings is connected to the suction side of the pump by way of a fluid passageway. The liquid leaking past the first face-seal ring is then returned direct to the suction side of the pump. A check valve is provided in the connecting passage, which opens only when the pressure in the space between the two face-seal rings rises above a predetermined value.

Other features and advantages of the rotary seal in accordance with the present invention will be better understood as described in the following specification and appended claims, in conjunction with the following drawings in which:

Figure 1:
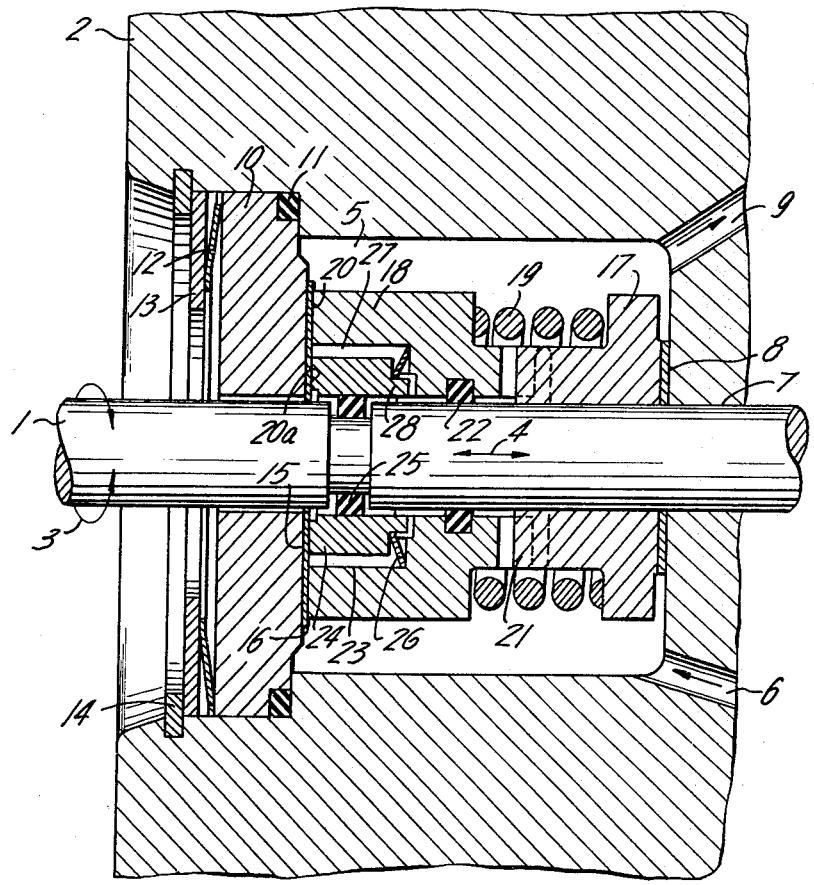
FIG. 1, is a fragmentary longitudinal sectional view of an oil pump provided with a first embodiment of a rotary seal according to the invention.

In FIG. 1 of the drawings, a pump shaft 1 projects from an oil pump housing 2. It is assumed that an electric driving motor, not shown, is positioned on the left-hand side of the pump housing for rotationally driving the shaft, and an oil pump, not shown, is on the right-hand side connected to the shaft. The shaft rotates in the direction indicated by an arrow 3 and moves axially forward and backwards, during operation, over a short axial distance in the directions illustrated by an arrow 4.

Leakage liquid or oil from the pump is contained in a seal chamber 5 in the housing into which is is admitted principally through a passage 6 which supplies leakage and excess oil from the pump, not shown. Oil likewise passes from a lubricated shaft bearing 7, through a floating pressure bearing 8, into the seal chamber 5. The leakage oil flows through a passage 9 to the return side of the pump. Thus, approximately the same pressure obtains in the chamber 5 as in the return line of the pump system.

The chamber 5 is sealed against the exterior by a stationary bearing plate 10 having a sealing ring 11. The bearing plate is urged against abutment surfaces on the housing and shaft, as shown, by a spring washer 12 which seats against a backing ring 13 provided with a stop 14 mounted on the housing. The bearing plate has a facing coating 15, on an inner face, of wear-resisting material on the innermost surface of which is formed a seal face 16 in the shape of a planar, annular surface.

Within the seal chamber 5, are located a collar defining a seat 17 firmly connected, for rotation therewith, to the shaft 1 and supported by the housing 2, by means of the pressure bearing 8, first face-seal ring 18 disposed circumferentially of the shaft, and a spring 19 which urges the face-seal ring 18 against the annular portion 20 of the bearing plate seal face 16. The seat 17 and the seal-face ring 18 are interconnected to rotate together by means of a system of axial teeth 21. With the help of a rubber seal ring 22, the face-seal ring is mounted on the shaft 1 in such a way that it is self-centering relative to the perpendicular seal face 16. A special-section ring, not shown, can be used as the seal ring, for instance a ring comprising three annular lips which bear against the shaft.

The face-seal ring 18 is a first ring of the rotary seal; one end-face of which is provided with an axial bore or recess 23 in which is coaxially fitted a second face-seal ring 24 which is likewise held in a self-centering position on the shaft 1 by means of a seal ring 25. A spring washer 26 urges the second face-seal ring 24 against a second portion 20a of the seal face 16 of the bearing plate. The two rings, 18, 24 are radially spaced and an annular space 27 is defined between two concentric portions of the face-seal rings 18 and 24. The second face-seal ring 24 is caused to participate in the rotary movement of the first face-seal ring by means of a system of teeth or a claw coupling 28.

In this arrangement, the first face-seal ring 18 operates in the normal manner, i.e. it seals off all the oil leakage from the chamber 5 except a few drops per day. The second face-seal ring 24 has only to prevent this small quantity of oil which, in addition, is not under any great pressure, from escaping from the annular space 27 to the exterior. It can be seen that the second face-seal ring is subjected only to the force of the spring 26, while fluctuations in pressure in the seal chamber 5 do not affect it. It can therefore be rated to give an optimum sealing action. The seal packings or rings 22 and 25, not only effect the self-centering mounting of the face-seal rings, but also prevent oil from escaping along the shaft 1. Here again, the portion between the two sealing rings 22 and 25 that communicates with the chamber 27 is under a lower pressure so that there is no difficulty in affecting a seal with the help of the ring 25. If for any reason, the first face-seal ring 18 should fail, the second face-seal ring 24 continues to operates as an emergency seal.

Figure 2:
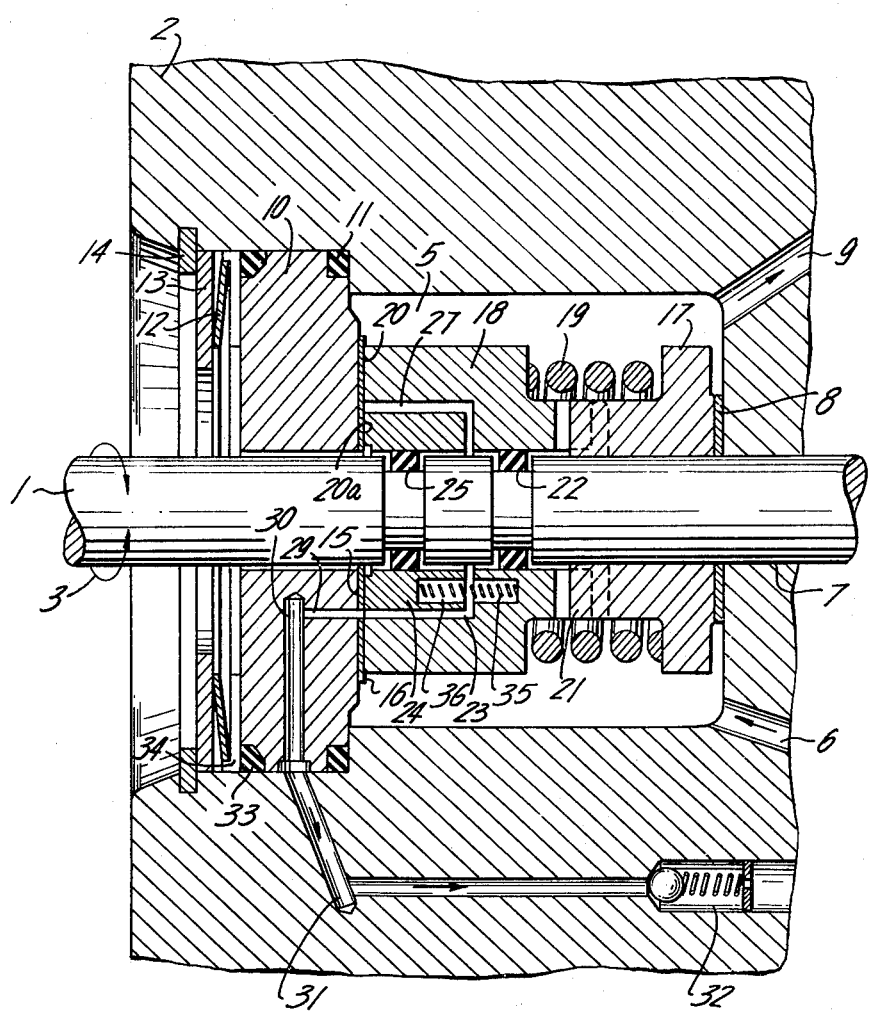
FIG. 2, is a fragmentary view of a modified embodiment, in longitudinal section of a rotary seal of the invention.

In the embodiment shown in FIG. 2, like parts are designated by the same reference symbols as used in FIG. 1. The following are the essential differences: The space 27 between the face-seal rings 18 and 20 communicates with a passage 31 in the housing by way of bores 29 and 30 in the bearing plate 10, and the channel 31 leads to the suction side of the pump through a check valve 32. No oil can therefore collect in the space 27; rather, it is always drawn off in the direction of the suction side of the pump. Consequently, the bearing plate 10 has a second sealing ring 33, which is held in position by means of a pressure washer 34.

The spring washer 26 is replaced by several helical springs 35, which are accommodated in bores 36 in the two face-seal rings 18 and 24. The bores are evenly distributed over the circumference. These springs not only serve to apply pressure to the face-seal ring 14, but also act as coupling means for imparting thereto the rotary movement of the face-seal ring 18.

Figure 3:
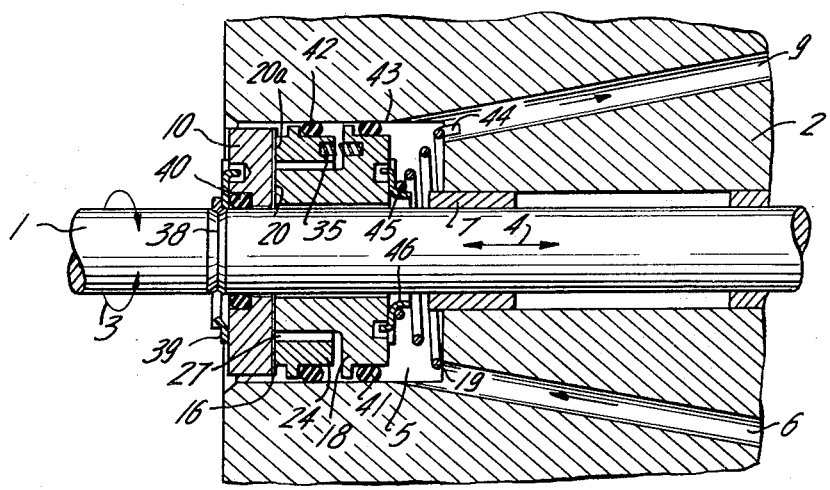
FIG. 3, is a fragmentary longitudinarl section view of third embodiment of a rotary seal illustrating the use of face-seal rings.

Likewise, in the embodiment illustrated in FIG. 3, like parts are designated by the same reference symbols as in FIGS. 1 and 2. In this construction, the bearing plate 10 is connected to the shaft 1 so as to rotate therewith and is sealed with respect to the shaft by means of a sealing ring 37. The shaft has a circumferential groove 38 into which is clipped a safety ring 39. A driving disc 40 engages, through a first lug, in a bore in the bearing plate 10 and, through a second lug, engages behind a stop on the safety ring 39. The safety ring may be constructed as a Seeger-UC ring, for example. The bearing plate 10 is pressed against the safety ring 39 by a spring 19 of the rotary seal and the pressure of the liquid in the chamber 5 and is thus held in a precisely perpendicular plane relative to the axis of the shaft.

Since the two face-seal rings 18 and 24 are kept stationary, the second face-seal ring 24 surrounds the first, 18, in the region of its sliding end-face. Sealing rings 41 and 42 are fitted respectively between the two face-seal rings and the inner peripheral wall 43 of the housing. The sealing means enable the two face-seal rings to be self-aligned and when axial displacement occurs, they roll without and adverse effect upon the sealing action.

The spring 19 is suspended by means of a tab 44 in the passage 9 and one of its ends 45 surrounds a washer 46 which is attached to the first face-seal ring 18 so that it cannot rotate. In this way, the spring 19 of the rotary seal simultaneously prevents the face-seal ring 18 from rotating. Consequently, the second face-seal ring 24 does not rotate either, since it is held by the spring 35 so that it cannot rotate relatively to the first face-seal ring. In this arrangement, no rotating seating is required for the spring 19.

The embodiments illustrated can be modified in a large number of ways without departing from the basic idea of the invention. For example, the seal faces on the bearing plate 10, which cooperate with the two face-seal rings, can be axially staggered. Also, more than two face-seal rings can, of course, be fitted one behind the other.

What we claim and desire to secure by Letters Patent is:

1. In a rotary seal, in combination with a rotary driven shaft, a bearing plate having a surface circumferentially of said shaft, a first seal ring having a seal face circumferentially of said shaft, means biasing said first seal ring in a direction axially of the shaft, causing said seal face on said first ring to bear against said bearing plate surface to effect a first fluid seal therebetween, means circumferentially of said first seal ring defining a chamber for receiving in operation a liquid under pressure, said first seal ring having an axial bore circumferentially of said shaft, a second seal ring in said bore defining an annular space in conjunction with said first seal ring therebetween, said second seal ring having a seal face coaxial with said seal face on said first seal ring circumferentially of said shaft, means biasing said second seal ring in a direction axially of said shaft causing it to bear on said bearing plate surface to effect a second fluid seal therebetween, means defining a passageway for receiving a liquid under pressure into said chamber, means defining with said bearing plate a fluid-tight seal to preclude leakage of said liquid from said chamber past said bearing plate, said first ring completely circumferentially enclosing said second ring so that said second ring is not exposed to said fluid under pressure in said chamber, and means defining a seal between said bearing plate and said shaft, whereby when said liquid under pressure is received in said chamber a slight leakage of liquid past said first fluid seal is permitted into said annular space and said leakage liquid is at a lower pressure and leakage thereof, from said annular space past said bearing plate is precluded by said second seal.

2. In a rotary seal according to claim 1, including means to impart relative motion between said bearing plate and said first and second seal rings.

3. In a rotary seal according to claim 1, including means maintaining said bearing plate stationary, and including means to impart rotation to both said seal rings in conjunction with rotation of said shaft.

4. In a rotary seal according to claim 3, including means for self-aligning said seal faces on said seal rings coplanar with said surface on said bearing plate to maintain said first and second seals fluid-tight.

5. In a rotary seal according to claim 1, including means maintaining said first and second seal rings stationary, and means to impart rotation to said bearing plate.

6. In a rotary seal according to claim 1, in which said surface on said bearing plate is in a plane substantially normal to the axis of said shaft, and in which the seal faces on said rings are substantially normal to said axis, and means to maintain said seal faces self-aligned normal to said axis to bear on said surface in a fluid-tight manner.

7. In a rotary seal according to claim 6, in which said means to maintain said seal faces self-aligned comprises for each seal ring a flexible ring thereon circumferentially of said shaft.

8. In a rotary seal according to claim 1, said surface on said bearing plate on which said seal ring seal faces bear comprises an annular planar surface.

9. In an oil pump, means defining a housing having a seal chamber in which oil is received under pressure, a rotary driven shaft extending axially inwardly and outwardly of said housing, the improvement which comprises a rotary seal arrangement in said chamber for precluding leakage along said shaft outwardly of said housing, means on said housing having surfaces circumferentially of said shaft for effecting two coaxial radially spaced sealing areas thereon, two coaxial, radially spaced seal rings in said chamber defining an annular space therebetween having radially spaced end faces circumferentially of said shaft biased into engagement with said surfaces for effecting two radially spaced substantially fluid-tight seals on said areas, one of said rings cooperative with the first-mentioned means enclosing the other ring and defining a bore within which the other ring is disposed without communication with said seal chamber so that said other ring is not subjected to oil under pressure in said seal chamber, and means independently biasing said two seal rings axially toward said areas on said surfaces, whereby leakage oil from said chamber past one of said seals enters said annular space at a reduced pressure and is retained therein by another seal formed by said seal rings and disposed radially closest to said shaft and oil will not leak along said shaft outwardly of said housing.

10. In an oil pump according to claim 9, including means for driving rotationally driving one of said seal rings from said shaft, and means coupling said two rings for joint rotation.

11. In an oil pump according to claim 9, including means to impart relative rotation between said surfaces and said end faces.

References Cited

UNITED STATES PATENTS

| | | | |
|---|---|---|---|
| 3,062,554 | 11/1962 | McGahan et al. | 277—27 X |
| 3,410,565 | 11/1968 | Williams | 277—27 X |
| 3,433,489 | 3/1969 | Wiese | 277—27 X |
| 2,362,854 | 11/1944 | Stephens | 277—91 |
| 2,585,154 | 2/1952 | Montgomery | 277—91 |
| 2,919,148 | 12/1959 | Smith | 277—91 X |
| 2,930,636 | 3/1960 | Tracy | 277—27 |
| 3,081,099 | 3/1963 | Walker et al. | 277—91 X |
| 3,085,808 | 4/1963 | Williams | 277—27 X |
| 3,141,677 | 7/1964 | Williams | 277—27 X |

JAMES KEE CHI, Primary Examiner

U.S. Cl. X.R.

277—27